United States Patent [19]

Foster

[11] Patent Number: 5,370,217

[45] Date of Patent: Dec. 6, 1994

[54] TAIL ASSEMBLY FOR RECIPROCATING FLOOR CONVEYOR

[76] Inventor: Raymond K. Foster, P.O. Box 1, Madras, Oreg. 97741

[21] Appl. No.: 154,812

[22] Filed: Nov. 18, 1993

[51] Int. Cl.$^5$ ................................ B65G 25/00
[52] U.S. Cl. ........................... 198/750; 414/525.1
[58] Field of Search ............... 198/750; 414/525.1, 414/525.9

[56] References Cited

U.S. PATENT DOCUMENTS

| | | | |
|---|---|---|---|
| Re. 33,196 | 4/1990 | Foster | 198/750 |
| 2,629,504 | 2/1953 | Peterson | 214/83.3 |
| 3,534,875 | 10/1970 | Hallstrom | 214/83.3 |
| 3,905,290 | 9/1975 | Caughey | 100/215 |
| 4,143,760 | 3/1979 | Hallstrom | 198/750 |
| 4,611,708 | 9/1986 | Foster | 198/750 |
| 4,709,805 | 12/1987 | Foster | 198/750 |
| 4,823,938 | 4/1989 | Foster | 198/750 |
| 4,962,848 | 10/1990 | Foster | 198/750 |

FOREIGN PATENT DOCUMENTS 1296087 5/1969 Germany.

*Primary Examiner*—Joseph E. Valenza
*Attorney, Agent, or Firm*—David P. Campbell

[57] ABSTRACT

A tail structure assembly (10) for a reciprocating floor conveyor (12) having a plurality of movable slats (22) mounted adjacent each other in a common plane. The tail structure assembly (10) includes a tail piece (26) fixedly mounted at the ends of each slat (22). Each tail piece includes a set of fingers (30) spaced from each other and extending toward the slats. The ends of the slats include a set of fingers (28) that extend toward the tail piece (26). The fingers (30) of the tail piece and the fingers (28) of the slats (22) mesh as the slats reciprocate.

10 Claims, 5 Drawing Sheets

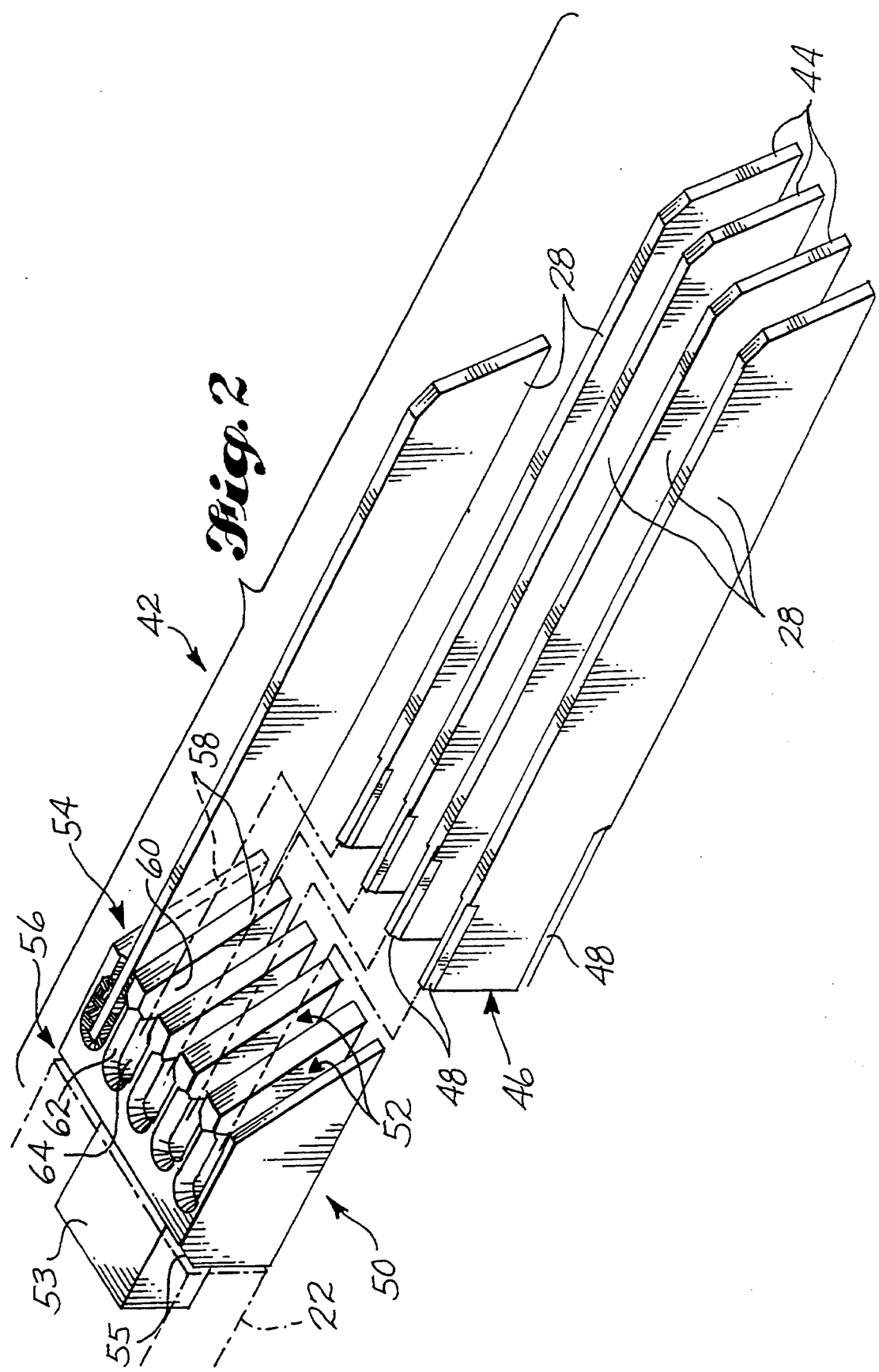

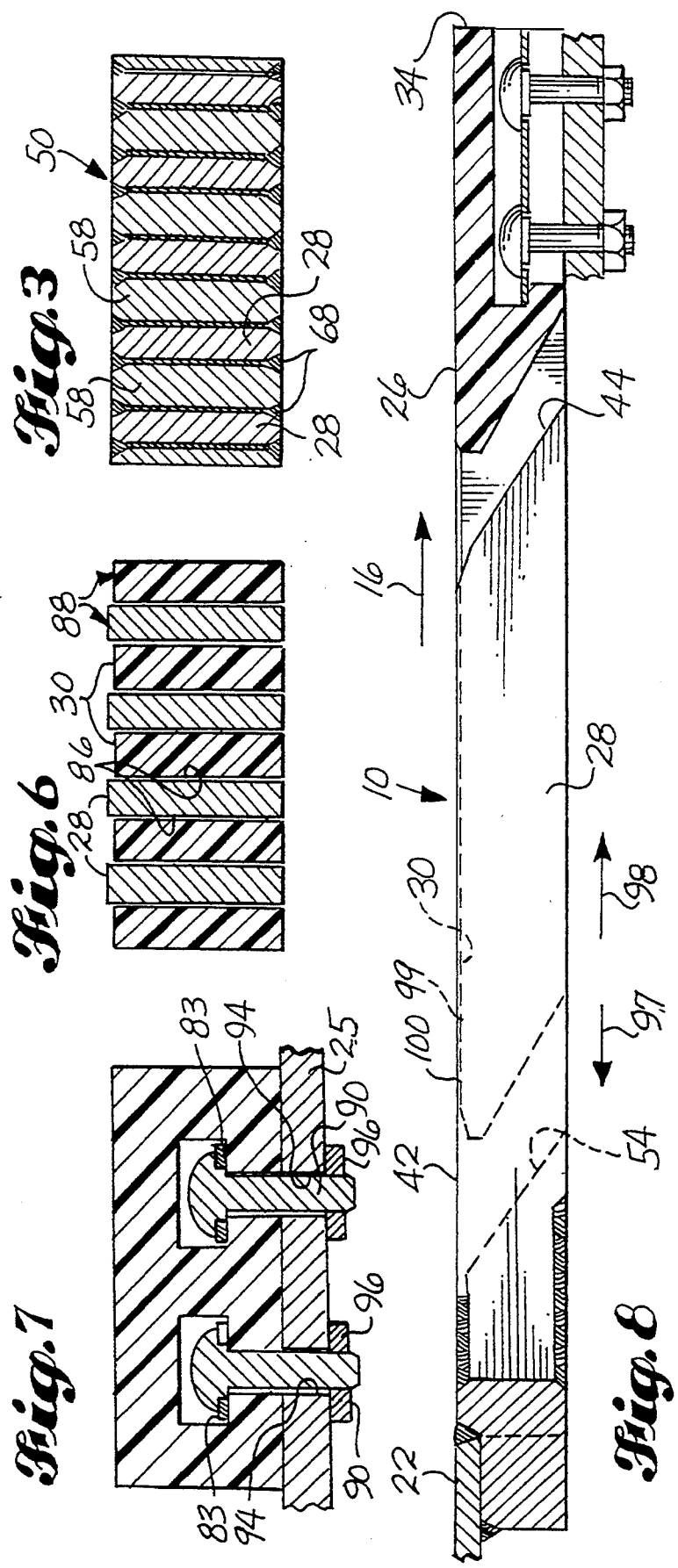

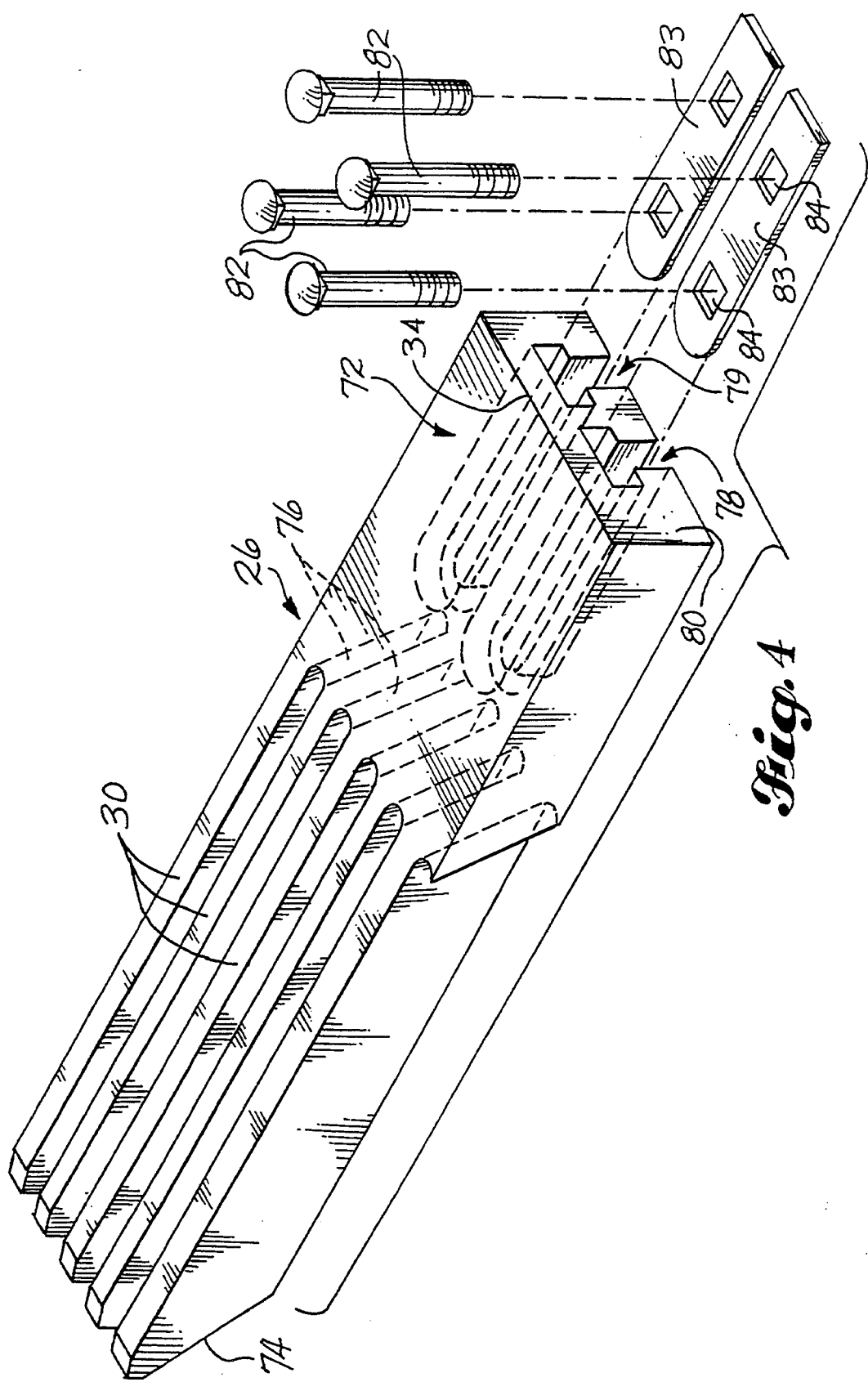

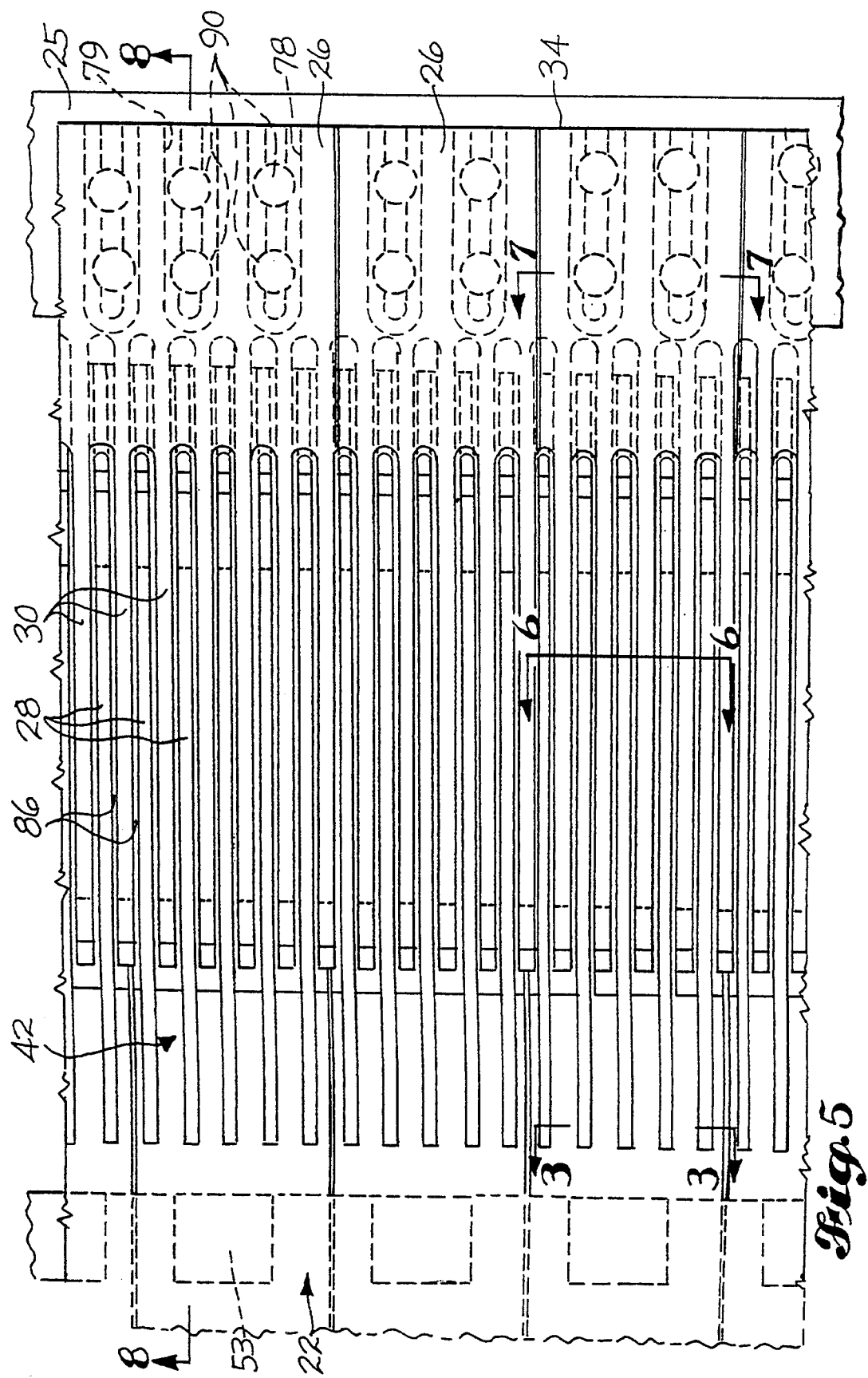

TAIL ASSEMBLY FOR RECIPROCATING FLOOR CONVEYOR

TECHNICAL FIELD

This invention relates to reciprocating floor conveyors of the type having a plurality of movable slats for conveying a load. More particularly, the invention relates to a tail assembly for an end of a reciprocating floor conveyor for providing a straight or even transverse edge at the end of the conveyor so that a load carried by the conveyor has a smooth transition surface over which it can travel as it moves off of or on to the conveyor.

BACKGROUND OF THE INVENTION

Reciprocating floor conveyors are now relatively well known and are used in a variety of applications. For example, reciprocating floor conveyors are used in truck-and-trailer vehicles as the floors of the cargo compartments of such vehicles, wherein they are used to load and unload cargo from the compartments. Examples of cargo carried by reciprocating floor conveyors include raw materials, such as pulp and paper products, boxed goods and products loaded on pallets. Reciprocating floor conveyors are also used in garbage-hauling vehicles, as well as in railway cars, to haul solid waste material to a waste disposal site.

Many types of reciprocating floor conveyors have been developed for use in these applications, and these reciprocating floor conveyors employ various methods for controlling the movement of their slat members. An early design for a reciprocating floor conveyor is disclosed in U.S. Pat. No. 2,629,504 of Peterson, granted Feb. 24, 1953. In this patent, a two-slat system is disclosed wherein the reciprocating floor conveyor includes two sets of slats. Both sets of slats are moved forwardly to convey the load, and then one set of slats is moved backwardly, while the other set is held stationary. Then the other set of slats is moved backwardly, and the cycle is repeated to move the load further along the conveyor.

West German Patent Publication 1,296,087 ('087), issued May 22, 1969, discloses a four-slat system. In this system, three sets of slats are always moving forwardly at any given time, while one set of the slats moves backwardly. The sequence of the backwardly-moving slats is rotated among the four slat members, so that three of the slat members are always moving forwardly to convey the load. U.S. Pat. No. 3,534,875 of Hallstrom, Jr., granted Oct. 20, 1970, discloses a three-slat system that uses the same principle as that of the West German '087 patent.

U.S. Pat. No. 3,905,290 ('290) of Caughey, granted Sep. 16, 1975, and U.S. Pat. No. 4,709,805 of Foster, granted Dec. 1, 1987, both disclose a four-slat system wherein all of the slats move forwardly together to convey the load, and then each of the four sets of slats sequentially moves backwardly until all four sets are in a back position, and then the cycle is repeated. U.S. Pat. No. 4,143,760 of Hallstrom, Jr., granted Mar. 13, 1979, discloses a system similar to that disclosed in the Caughey '290 patent, but with three sets of slats, wherein all three sets of slats move forwardly and each set sequentially moves rearwardly.

U.S. Pat. No. 4,962,848 of Foster, granted Oct. 16, 1990, discloses a reciprocating floor conveyor having three sets of slats, with one set of slats permanently fixed in position, and the other two sets of slats are movable forwardly together and backwardly independently. All of the above-discussed patents, which are incorporated herein by reference, utilize the same basic principle of having a greater number of slats stationary or moving forwardly than are moving backwardly, when some slats are moved backwardly in a nonconveying mode.

While the foregoing reciprocating floor conveyors work satisfactorily in conveying a wide variety of loads, certain types of loads can be damaged at the transition ends of these conveyors where the loads move off of or onto the conveyors. At the transition ends of the conveyor, the ends of the slats can either be even or staggered, depending on the stage of the conveyor in its operating cycle. By way of example, FIGS. 1-4 in U.S. Pat. No. 4,962,848 illustrate how the ends of the slats are staggered at certain points in their operating cycle. It has been found that for certain materials, the staggered configuration at the transition end of the conveyor can damage the load being conveyed. For example, as the slat members move back and forth, the forward corners of the slat members and the sharp side edges of the slat members can cut, tear, scratch, or puncture the load being conveyed. This problem has been particularly troublesome for large rolls of paper, which are relatively delicate compared to crates, for example, and thus, can be easily damaged by a sharp object.

In addition, certain loads are somewhat flexible in nature and, thus, tend to sag in the gaps between the offset, forward ends of a set of slats. This, in conjunction with the sawing-like action of the slat members, increases the potential of the slats damaging the load.

Accordingly, a principle object of the present invention is to provide a reciprocating floor conveyor that avoids these problems when conveying certain types of material.

DISCLOSURE OF THE INVENTION

The reciprocating floor conveyor of the present invention comprises generally a plurality of elongated floor members or slats mounted adjacent each other in a common plane to form the conveying surface of the reciprocating floor conveyor. The elongated floor members are reciprocated in a manner whereby some of the floor members are staggered or displaced longitudinally from each other, depending on the stage of the conveyor in its operating cycle. At the transition end of the reciprocating floor conveyor, wherein either the load moves off of or onto the conveyor, the ends of the slats are provided each with a plurality of fingers or prongs mounted to the ends of the slats and spaced laterally from each other. The fingers extend in the longitudinal direction of movement of the elongated slats. A stationary tail piece assembly is provided at the transition end of the conveyor adjacent the ends of the slats. The stationary tail piece includes a transverse strip with a continuous tail edge extending laterally of the slats. A plurality of fingers or prongs extend from the transverse strip toward the slats. The fingers of the stationary tail piece assembly are spaced laterally from each other and extend in the longitudinal direction of movement of the slats. The fingers of the slats and the fingers of the stationary tail piece assembly are adapted to intersect or mesh with each other as the slats reciprocate between their forward and backward positions.

The tail edge provides a smooth, stationary surface at the transition end of the conveyor. The gaps between the fingers are relatively small as compared to the spaces between the offset ends of slats of prior art conveyors. As a result, a smooth, even tail edge is provided at the transition end of the reciprocating floor conveyor, and a continuous surface is created between the slat members and the edge. So arranged, a load having a delicate surface can be conveyed off of or onto the reciprocating floor conveyor in a manner that avoids any contact by the surface of the load with any sharp edges or corners.

In addition, the narrow spacing between the intersecting fingers on both the slats and the tail piece assembly prevents appreciable sagging of the load between the fingers. This further reduces the potential for damage to the load.

Other features and advantages of the present invention can be seen and understood by examination of the appended drawings, description of the best mode for carrying out the invention, and the claims, all of which are incorporated herein by reference as a portion of the disclosure of the present invention.

BRIEF DESCRIPTION OF THE DRAWINGS

Like reference numerals are used to indicate like parts throughout the various figures of the drawing, wherein:

FIG. 2 is an enlarged scale exploded isometric view of the slat attachment for the tail structure assembly of FIG. 1;

FIG. 3 is a section view taken along line 3—3 of FIG. 5 showing the welds used to manufacture the slat attachment;

FIG. 4 is an enlarged scale isometric view of the tail piece for the tail structure assembly of FIG. 1;

FIG. 5 is a fragmentary enlarged scale plan view of the tail structure assembly of FIG. 1;

FIG. 6 is a section view taken along the line 6—6 of FIG. 5 showing the meshing between the fingers of the slat attachment and the tail piece;

FIG. 7 is a section view taken along the line 7—7 of FIG. 5 showing the bolts used to secure the tail piece to the supporting frame for the reciprocating floor conveyor; and FIG. 8 is a section view taken along the line 8—8 of FIG. 5.

BEST MODE FOR CARRYING OUT THE INVENTION

Figure 1:
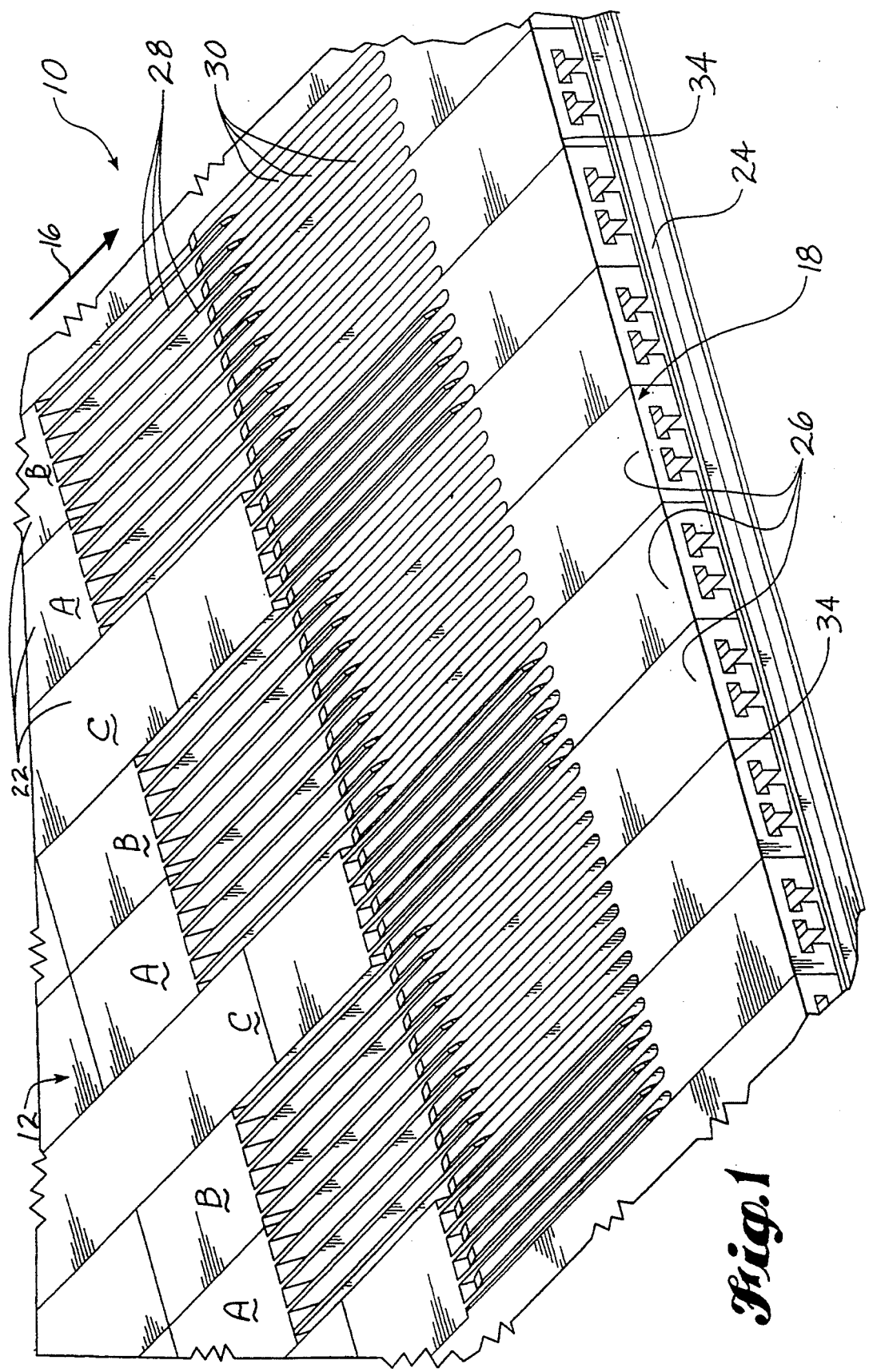
FIG. 1 is a fragmentary isometric view of the tail structure assembly for a reciprocating floor conveyor of the present invention.

Referring now to the drawings, FIG. 1 illustrates the tail assembly 10 for a reciprocating floor conveyor 12 constructed in accordance with a preferred embodiment of the present invention. The reciprocating floor conveyor 12 is adapted to convey a load (not shown) in the direction indicated by arrow 16 toward what shall be referred to as a transition end 18 of the reciprocating floor conveyor 12. The transition end 18 is the end of the reciprocating floor conveyor over which the load, such as a roll of paper, for example, moves as the load is conveyed off of the conveyor. However, it should be noted that the tail structure assembly 10 can be mounted at the end of the conveyor at which a load is moved onto the conveyor, which end would still be considered a transition end, as the load would be transitioning from off of the conveyor onto the conveyor. Also, it should be noted that the tail structure assembly 10 could be mounted at both ends of the reciprocating floor conveyor if a particular application required the conveyor to move a load received at one end along the length of the conveyor and then move the load off of the other end of the conveyor.

The reciprocating floor conveyor 12 includes a plurality of reciprocating floor members or slats 22 that are movably mounted in a common plane on a support frame (not shown). The reciprocating floor conveyor 12 may be of the type disclosed in my U.S. Pat. No. 4,823,938, granted on Apr. 25, 1989, which is incorporated herein by reference. The tail structure assembly 10 includes a plurality of stationary tail piece sections 26 mounted on a support frame 24 and in the same common plane as the slats 22 of the reciprocating floor conveyor 12. Each tail piece section 26 corresponds to a slat 22. The tail structure assembly 10 also includes a set of fingers or prongs 28 that extend forwardly from each slat 22 toward the tail piece sections 26. The tail piece sections 26 include a corresponding set of fingers or prongs 30 that extend rearwardly toward the slats 22. The fingers 28 of the slats 22 and the fingers 30 of the tail piece sections 26 intersect or mesh as the slats reciprocate toward and away from the tail piece sections 26. The tail piece sections 26 form a straight edge 34 over which the load is conveyed. The intersection of the fingers of the tail piece sections 26 and the slats 22 provides a smooth transition surface between the tail edge 34 of the tail piece sections 26 and the conveying surface of the slats 22.

FIG. 2 is an enlarged scale isometric view of a slat attachment 42 used to secure the fingers 28 to the slats 22 of the reciprocating floor conveyor. The slat attachment 42 includes a set of fingers 28 comprising, in a preferred embodiment, five fingers. However, other numbers of fingers could be used for the slat attachments depending upon the size of the slats. Each finger is an elongated strip of metal having generally a rectangular cross-section. The forward ends 44 of the metal strips are sloped and face upwardly at approximately forty-five degrees. The opposite ends 46 of the metal strips have beveled or chamfered edges 48 along all four side edges of the strips. The beveled edges serve the purpose of increasing the weld area when the metal strips are secured to a fork-like support block 50.

The fork-like support block 50 is a generally rectangular block having a set of five slots 52, each for receiving one of the fingers 28. The slots 52 extend from the forward end 54 of the support block 50 inwardly of the block and terminate at a point spaced from the rear end 56 of the support block 50. The slots 52 in the support block 50 create a series of prongs 58 extending forwardly of the block. The forward ends 54 of the prongs 58 are angled and face upwardly in a similar manner to the forward ends 44 of the fingers 28. The inner sidewalls 60 of the slots 52 include chamfered portions 62 and channeled portions 64. The chamfered portions 62 and the channeled portions 64, along with the chamfered or beveled edges 48 of the fingers 28 create a large weld area for securing the rearward ends 46 of the fingers within the slots 52.

FIG. 3 is a cross-section view taken along the line 3—3 of FIG. 5. FIG. 3 shows the weld areas 68 between the fingers 28 and the prongs 58 of the support block. As can be seen, the weld areas 68 extend along the vertical length of the fingers 28 and prongs 58 with the chamfered edges and channels of the slots 52 (FIG. 2) creating a relatively large weld area 68 for securely fastening the fingers 28 to the support block 50.

Referring back to FIG. 2, a mounting block 53 extends from the back end 56 of the support block 50. Mounting block 53 mounts within the interior of the end of a slat 22 where it is welded thereto. The upper surface of the mounting block 53 is lower than the upper surface of the support block 50. This allows the top panel of the slat to slide over the mounting block 53, and fit flush with the support block 50. The rear edge 55 of the support block 50 is beveled to allow for a large weld area for securing the slat and the support block together. After the slot is welded to the support block 50, the welds are ground and sanded so that a smooth upper surface is created between the slats 22 and the slat attachment 42.

FIG. 4 is an isometric view of the tail piece section 26. The tail piece section 26 is made of preferably a plastic material such as polyvinyl chloride (PVC). The tail piece section 26 is generally rectangular in shape and includes a transverse strip 72 that functions as a mounting end for the tail piece section, and a series of fingers 30 extending from the transverse strip 72. The length of the fingers 30 is approximately two thirds of the length of the tail piece section 26. The forward ends 74 of the fingers 30 are angled and face downwardly at approximately an angle of forty-five degrees. The web portions 76 between the fingers 74 are also angled and face downwardly in a similar manner to the forward ends 74 of the fingers 30. The mounting portion 72 of the tail piece section 26 includes a pair of T-slots 78, 79. Slots 78, 79 extend from the tail end 80 of the tail piece section 26 and terminate inwardly of the mounting portion 72 of the tail piece section 26 in close proximity to the web portions 76 between the fingers 30. Slots 78, 79 serve the purpose of receiving a set of carriage bolts 82 that secure the tail piece section 26 to the support frame of the reciprocating floor conveyor. A pair of elongated washers 83 are provided within the upper portions of slots 78, 79. Washers 83 each have a pair of holes 84 through which extend the carriage bolts 82.

FIG. 5 is an enlarged scale fragmentary plan view of the tail structure assembly 10. As shown in FIG. 5, the slat attachments 42 are mounted to slats 22 with the mounting block 53 of the slat attachment 42 welded to the end of the slat 22.

The tail piece sections 26 are mounted to the support frame 25 in a manner so that the fingers 30 of the tail piece sections 26 mesh with the fingers 28 of the slat attachments 42. The fingers 28, 30 mesh with each other in a manner so that the gaps 86 between the fingers are relatively narrow as compared with the width of the fingers. The intersection or meshing of the fingers 28, 30 is illustrated in FIG. 6. As can be seen in FIG. 6, the gaps 86 between the fingers 28, 30 are relatively narrow, which creates a support surface 88 for supporting a load as the load moves over the transition end of the reciprocating floor conveyor.

Referring back to FIG. 5, the tail piece sections 26 are secured to the support frame 25 each by a set of four carriage bolts 90. Each slot 78, 79 receives a pair of carriage bolts 90. As shown in FIG. 7, each carriage bolt 90 extends through an elongated washer 83 through its respective slot and through a corresponding hole 94 in the support frame 25 and is secured by a nut 96 on the underside of the support frame 25.

FIG. 8 is a cross-section view of the tail structure assembly 10. The fingers 30 of the tail piece sections 26 are shown in dotted lines to illustrate the intersection between the fingers 30 of the tail piece section 26 and the fingers 28 of the slide attachments 42. As shown in FIG. 8, the slide attachment 42 is at its closest position to the tail piece section 26. During the operating cycle of the reciprocating floor conveyor, the slats 22, including the slat attachment 42 will move to the left as indicated by arrow 97 and then back to the right as indicated by arrow 98 in a manner to cause the load to move across the tail structure assembly 10 in the direction indicated by arrow 16. The top edges 99 and 100 of the tail piece section 26 and slat attachment 42 form a smooth continuous surface over which the load can move. In addition, the tail edge 34 of the tail piece section 26 forms a straight, transverse edge over which the load can move. This arrangement provides a relatively smooth surface for the load and substantially reduces the potential for a sharp corner or edge to scratch, tear, or puncture the load.

The forward ends 44 of fingers 28 and the forward ends 54 of the slat attachment 42 are angled and face upwardly so that any debris or particles that fall between fingers 28, 30 are pushed upwardly back onto the conveyor.

In operation, as best shown in FIG. 1, the slats 22 all move together in one direction to convey a load. In FIG. 1, the slats move in the direction indicated by arrow 16 toward the tail piece sections 26 until the slats 22 are at their closest position to the tail piece sections. During this step, the load is moved toward the transition end of the conveyor.

A first set of slats A moves backwardly, followed then by a second set of slats B. Then, the third set of slats C move backwardly, and the cycle is repeated. As the slats reciprocate to convey the load forwardly toward the transition end of the conveyor, the tail structure assembly 10 provides a smooth surface for the load and a straight edge 34 over which the load moves.

It has been found that such an arrangement significantly reduces damage to the load caused by the ends of the slats. Accordingly, an improved reciprocating floor conveyor is provided for conveying loads that are susceptible to damage caused by sharp edges.

While the illustrated and above-described embodiment represents a preferred mode contemplated by the inventor for the invention, it is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently-described and illustrated embodiment is nonlimitive and is for illustration only. Instead, my patent protection is to be limited only by the following claim or claims interpreted according to accepted doctrines of claim interpretation, including the doctrine of equivalents and reversal of parts.

What is claimed is:

1. A tail structure assembly for a reciprocating floor conveyor, the reciprocating floor conveyor including a plurality of elongated slats mounted adjacent each other in a common plane, the elongated slats having forward ends and rearward ends, and the elongated slats in use moving longitudinally between first and second positions to convey a load along the conveyor, the elongated slats being reciprocable in a manner whereby some of the slats are displaced longitudinally from other slats so that at the forward end of the slats, a staggered configuration is created over which the load must move, the tail structure assembly comprising:

a finger-like slat attachment mounted to the forward end of each elongated slat, the slat attachment including a plurality of fingers spaced laterally from each other and extending in the longitudinal direction of movement of the elongated slats, and a stationary tail piece at the forward end of the conveyor, the stationary tail piece including a transverse strip with a straight tail edge extending laterally of the elongated slats and a plurality of fingers spaced laterally and extending from the transverse strip toward the elongated slats in the longitudinal direction of movement of the slats, the fingers of the stationary tail piece and the fingers of the slat attachments adapted to mesh as the elongated slats reciprocate between their first and second positions, whereby, in the longitudinal direction of movement of the elongated slats, a substantially continuous upper surface is created that includes a straight tail edge over which the load can move.

2. The tail structure assembly of claim 1, wherein the stationary tail piece includes a series of tail piece sections, each tail piece section including a transverse strip section and a plurality of fingers extending from the strip section.

3. The tail structure assembly of claim 1, wherein the stationary tail piece includes, on the underside thereof, means for attaching the tail piece in a stationary position.

4. The tail structure assembly of claim 1, wherein the forward ends of the fingers of the slat attachments are sloped and face upwardly, and the slat attachments include web surfaces between the fingers of the slat attachments that are also sloped and face upwardly, so that any particles of material being conveyed, which fall between the fingers as the slats reciprocate, engage the sloped surfaces of the fingers and the webs and are pushed upwardly and moved forwardly.

5. The tail structure assembly of claim 1, wherein the ends of the fingers of the tail piece have ends that are angled and face downwardly and the tail piece has web surfaces between the fingers of the tail piece that are angled and face downwardly.

6. A reciprocating floor conveyor for conveying a load, comprising:

a frame, a plurality of sets of elongated floor members mounted to the frame adjacent each other in a common plane to form the floor of the conveyor, at least some of the sets of elongated floor members being movable along their length between first and second positions, the floor members collectively having a transition end over which the load is moved, the movable elongated floor members each including a plurality of fingers spaced from each other and extending longitudinally outwardly from the transition end of each movable floor member, and a tail piece fixedly mounted to the frame adjacent each transition end of the movable elongated floor members, the tail piece including a transverse strip having a straight tail edge transverse to the movable floor members and a plurality of fingers extending from the transverse strip toward the movable floor members, the fingers of the movable floor members adapted to mesh with the fingers of the tail piece as the movable floor members reciprocate between their first and second positions, whereby, in the longitudinal direction of movement of the elongated floor members, a substantially continuous upper surface is created that includes a straight transverse edge over which the load can move.

7. The reciprocating floor conveyor of claim 6, wherein the stationary tail piece includes a series of tail piece sections, one for each elongated floor member, each tail piece section including a transverse strip section and a plurality of fingers extending from the strip section.

8. The reciprocating floor conveyor of claim 6, wherein the stationary tail piece includes, on the underside thereof, means for attaching the tail piece in a stationary position.

9. The reciprocating floor conveyor of claim 6, wherein the forward ends of the fingers of the floor members are sloped and face upwardly, and the floor members include web surfaces between the fingers that are also sloped and face upwardly, so that any particles of material being conveyed, which fall between the fingers as the floor members reciprocate, engage the sloped surfaces of the fingers and webs and are pushed upwardly and moved forwardly.

10. The reciprocating floor conveyor of claim 6, wherein the ends of the fingers of the tail piece are angled and face downwardly and the tail piece includes web surfaces between the fingers of the tail piece that are angled and face downwardly.

* * * * *